United States Patent
Twork et al.

(10) Patent No.: US 9,975,477 B2
(45) Date of Patent: May 22, 2018

(54) VEHICLE INTERIOR PANEL SURFACE LIGHTING

(71) Applicant: Faurecia Interior Systems, Inc., Auburn Hills, MI (US)

(72) Inventors: Michael Twork, White Lake, MI (US); Daniel R. Vander Sluis, Rochester Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 294 days.

(21) Appl. No.: 14/928,015

(22) Filed: Oct. 30, 2015

(65) Prior Publication Data
US 2017/0120810 A1   May 4, 2017

(51) Int. Cl.
*B60Q 3/54* (2017.01)
*B60Q 3/02* (2006.01)
*B60Q 3/14* (2017.01)

(52) U.S. Cl.
CPC ......... *B60Q 3/0293* (2013.01); *B60Q 3/0286* (2013.01); *B60Q 3/14* (2017.02); *B60Q 3/54* (2017.02); *B60Q 2500/00* (2013.01)

(58) Field of Classification Search
CPC .......................... B60Q 3/0293; B60Q 3/0286; B60Q 2500/00; B60Q 3/14; B60Q 3/54
USPC .................................. 362/459, 488–492, 84
See application file for complete search history.

(56) References Cited

U.S. PATENT DOCUMENTS

| | | | | |
|---|---|---|---|---|
| 8,376,596 | B2* | 2/2013 | Beau ..................... | B60K 35/00 29/897.2 |
| 2001/0030871 | A1* | 10/2001 | Anderson, Jr. ......... | H01H 9/18 362/488 |
| 2006/0062006 | A1* | 3/2006 | Radu .................... | B29C 45/0017 362/488 |
| 2006/0067083 | A1* | 3/2006 | Bogdan ............. | B29C 45/14778 362/488 |
| 2008/0101080 | A1* | 5/2008 | Hein ..................... | B60Q 1/323 362/488 |
| 2008/0137355 | A1* | 6/2008 | Offermann ........ | B32B 17/10036 362/488 |
| 2009/0135582 | A1* | 5/2009 | Miller ................. | H01L 51/5262 362/84 |
| 2016/0355124 | A1* | 12/2016 | Cervantes Guarneros ................................. | B60Q 3/54 |

\* cited by examiner

*Primary Examiner* — Laura Tso
(74) *Attorney, Agent, or Firm* — Reising Ethington P.C.

(57) ABSTRACT

A vehicle interior panel can be constructed to include accent lighting in the form of an electroluminescent element that includes a thin multi-layer film disposed over a substrate. The multi-layer film is sufficiently thin to conform to the shape of the substrate surface over which it is disposed, making it possible to integrate accent lighting with the panel in a manner that gives the impression that the light is produced at the visible outer surface of the panel. The substrate plays a dual role, providing both the overall shape, contour, and structure for the panel while additionally functioning as one of the electrodes of the electroluminescent element. The substrate includes an electrically active material that is integrated into a plastic material either by blending an additive with the plastic material prior to molding the substrate, or by insert molding and embedding electrically conductive material into the plastic material.

15 Claims, 2 Drawing Sheets

VEHICLE INTERIOR PANEL SURFACE LIGHTING

TECHNICAL FIELD

The present disclosure relates generally to accent lighting for a vehicle interior panel and, more particularly, to accent lighting that conforms to the shape of a vehicle interior panel surface.

BACKGROUND

Vehicle interiors may be equipped with any of a variety of types of accent lighting. For instance, lighting modules may be built into an overhead ceiling panel, door panel, console panel, or instrument panel. Such lighting modules typically require an opening in the panel to be installed therein and/or require sufficient space behind the panel to accommodate lighting module components that are desired to be hidden from view. A vehicle interior panel with such a lighting module installed can have a pieced-together look—i.e., it is noticeable that the accent lighting is produced by a separately installed piece. Attempts have been made to produce more integrated accent lighting for vehicle interior panels, but the available options are limited and problematic, especially where the visible panel surface has a non-planar, three-dimensional contour.

U.S. Pat. No. 8,470,388 to Zsinko et al. discloses a so-called conformal electroluminescent system that includes multiple layers of materials sprayed one on top of the other. The system relies largely on an electrically conductive backplane material formed from a sprayed-on conductive paint that contains a high concentration of highly conductive metal particles. One example of such a paint disclosed by Zsinko is Silvaspray™ (Caswell, Inc., Lyons, N.Y., USA), which contains a high concentration of silver. The Zsinko system is generally cost-prohibitive due to this reliance on expensive metal content. In addition, the painting process is characterized by a high scrap rate, as uniformly thick and defect-free paint films can be difficult to achieve, especially when the paint has such a high metal content.

SUMMARY

In accordance with one embodiment, a vehicle interior panel includes a substrate comprising an electrically active material integrated into a plastic material. The substrate is molded to provide an overall shape and contour of the vehicle interior panel and a majority of the thickness of the vehicle interior panel. The vehicle interior panel also includes a light-emitting film layer overlying an active area of the substrate. The light-emitting film layer has a first side facing the substrate and an opposite second side facing away from the substrate. The light-emitting film layer is configured to emit light when a voltage potential is applied across the first and second sides. The vehicle interior panel also includes an electrically conductive film layer overlying and in contact with the second side of the light-emitting film layer and overlying the active area of the substrate. The electrically conductive film layer is at least partially transparent to the light emitted by the light-emitting film layer when the voltage potential is applied. The vehicle interior panel also includes a topcoat film layer overlying the electrically conductive film layer and the active area of the substrate. The topcoat film layer extends beyond the active area of the substrate to provide a visible outer surface of the vehicle interior panel when installed in a vehicle cabin. The electrically active material of the substrate is present at least at the active area so that the light-emitting film layer emits light from the visible outer surface of the vehicle interior panel when the voltage potential is applied across the active area of the substrate and the electrically conductive film layer.

Embodiments of the vehicle interior panel include a dielectric film layer interposed between and in contact with the active area of the substrate and the light-emitting film layer.

In some embodiments, the first side of the light-emitting film layer is in contact with the active area of the substrate.

Some embodiments of the vehicle interior panel include a bus bar film layer in contact with the electrically conductive film layer at a location overlying a boundary of the active area of the substrate. The bus bar film layer includes a metallic material and is configured to receive one side of the voltage potential.

In some embodiments, the electrically active material is an additive to the plastic material and is distributed throughout the plastic material in a form that allows the plastic material to be molded into said overall shape.

In some embodiments, the substrate comprises a non-conductive additive distributed throughout the plastic material. The additive is formulated to become conductive when activated by a laser, and the electrically active material is formed from activated additive at the active area of the substrate.

In some embodiments, the electrically active material of the substrate includes insert-molded metal bus bars configured to receive one side of the voltage potential.

In some embodiments, the electrically active material of the substrate comprises a metal foil embedded in the plastic material. The foil is interposed between the plastic material and an insulating film layer at an outer side of the substrate that faces toward the overlying film layers.

In accordance with another embodiment, a method of making a vehicle interior panel that emits light from a visible outer surface includes the steps of: (a) providing a substrate comprising an electrically active material integrated into a plastic material, the substrate being molded to provide an overall shape and contour of the vehicle interior panel and a majority of the thickness of the vehicle interior panel; (b) disposing a light-emitting film layer over an active area of the substrate, said film layer being configured to emit light when a voltage potential is applied across opposite faces of said layer; (c) disposing an electrically conductive film layer over the light-emitting film layer and the active area of the substrate, wherein the electrically conductive film layer is at least partially transparent to the light emitted by the light-emitting film layer when the voltage potential is applied; and (d) disposing a topcoat film layer over the electrically conductive film layer and the active area of the substrate such that the topcoat film layer extends beyond the active area of the substrate to provide the visible outer surface of the vehicle interior panel when installed in a vehicle cabin. The electrically active material of the substrate is present at least at the active area so that the light-emitting film layer emits light from the visible outer surface of the vehicle interior panel when the voltage potential is applied across the active area of the substrate and the electrically conductive film layer.

In some embodiments, the method includes the step of disposing a bus bar film layer over the substrate and in contact with the electrically conductive film layer at a location overlying a boundary of the active area of the substrate. The bus bar film layer includes a metallic material and is configured to receive one side of the voltage potential.

In some embodiments, step (b), step (c), step (d), the step of disposing a bus bar film, or any combination of said steps is performed by pad printing.

In some embodiments, step (a) includes molding the substrate from a pelletized material comprising the plastic material and the electrically active material.

In some embodiments, step (a) includes molding a molding material into said overall shape and contour. The molding material includes the plastic material and a non-conductive additive that is formulated to become conductive when activated by a laser. Step (a) also includes activating some of the additive with a laser to form the electrically active material.

In some embodiments, step (a) includes insert-molding metal bus bars into the plastic material.

In some embodiments, step (a) comprises insert-molding a film onto the plastic material. The film includes a metal foil and an insulating film layer, and the metal foil faces toward the plastic material during the step of insert-molding.

Within the scope of this application it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF ILLUSTRATIVE EMBODIMENT(S)

As will become apparent from the following disclosure, a vehicle interior panel can be constructed to include interior accent lighting in the form of an electroluminescent element that includes a thin multi-layer film disposed over a substrate. The multi-layer film is sufficiently thin to conform to the shape of the substrate surface over which it is disposed, making it possible to integrate accent lighting with the panel in a manner that gives the impression that the light is produced at the visible outer surface of the panel. This allows the panel to be made with a smooth and uninterrupted outer surface, even when the surface includes a non-planar or three-dimensional contour. In addition, the substrate plays a dual role in that it provides the overall shape, contour, and structure for the panel while additionally functioning as one of the electrodes of the electroluminescent element. The disclosed vehicle interior panel can thereby effectively eliminate the need for a separately applied conductive layer of material between the substrate and the light-emitting layer(s) of the structure, potentially reducing manufacturing time, cost, and defects.

Figure 1:
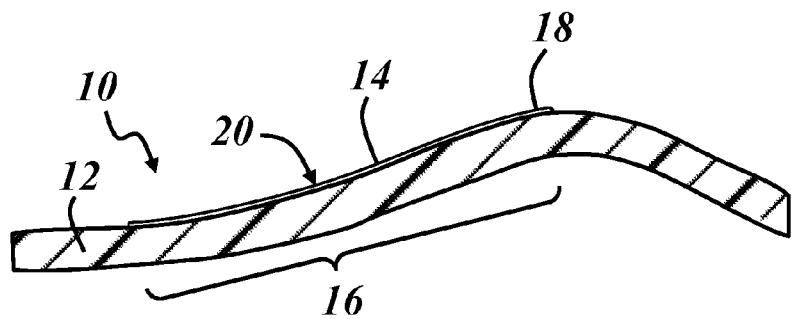
FIG. 1 is a cross-sectional view of a vehicle interior panel including an electroluminescent element.

Referring now to FIG. 1, there is shown a cross-sectional view of an exemplary vehicle interior panel 10. The panel 10 includes a substrate 12 and a thin multi-layer film 14 disposed over an active area 16 of the substrate. The panel has an outer surface 18 that is visible from the passenger cabin of a vehicle when installed in the vehicle. Together, the thin multi-layer film 14 and the active area 16 of the substrate 12 define an electroluminescent element 20 that is an integral part of the panel 10. The electroluminescent element 20 and, thereby, the vehicle interior panel 10, emit light at the outer surface 18 of the panel when the electroluminescent element is powered. In this example, the multi-layer film 14 and the active area 16 of the substrate 12 have a smaller projected area than the outer surface 18 of the panel 10, but one or both could have a projected area up to that of the outer surface of the panel. The panel 10 may include more than one electroluminescent element 20. For example, the panel 10 may include a plurality of separate multi-layer films 14 disposed over the substrate, or a single multi-layer film 14 may be disposed over a plurality of separate active areas 16 of the substrate. The panel 10 can be any vehicle interior panel, including an instrument panel, a door panel, an overhead panel, a console panel, a seat panel, a floor panel, a pillar trim panel, or a sun visor panel, to name a few.

FIG. 1 also generally illustrates the size scale of the substrate 12 relative to the other layers of the electroluminescent element 20. The substrate 12 is formed from a moldable plastic-based material and has a thickness generally in the range of a few millimeters. A typical injection-molded substrate 12 may range in thickness from 2.0 to 5.0 mm, for example, or about 3.0 mm in certain specific embodiments. Each of the individual layers of the multi-layer film 14 has a thickness generally in the micron range, on the order of 100 microns or less and, typically, on the order of 50 microns or less. Thus, even with multiple layers, the entire thickness of the multilayer film 14 can be 100 microns or less. As such, the multi-layer film 14 represents a very small portion of the overall thickness of the panel 10 relative to the substrate 12. The substrate 12 provides a majority of the thickness of the panel 10, and typically has a thickness that is more than an order of magnitude larger than the thickness of the multi-layer film 14. The substrate 12 may provide at least 95% of the total panel thickness and up to about 99% of the total panel thickness.

Figure 2:
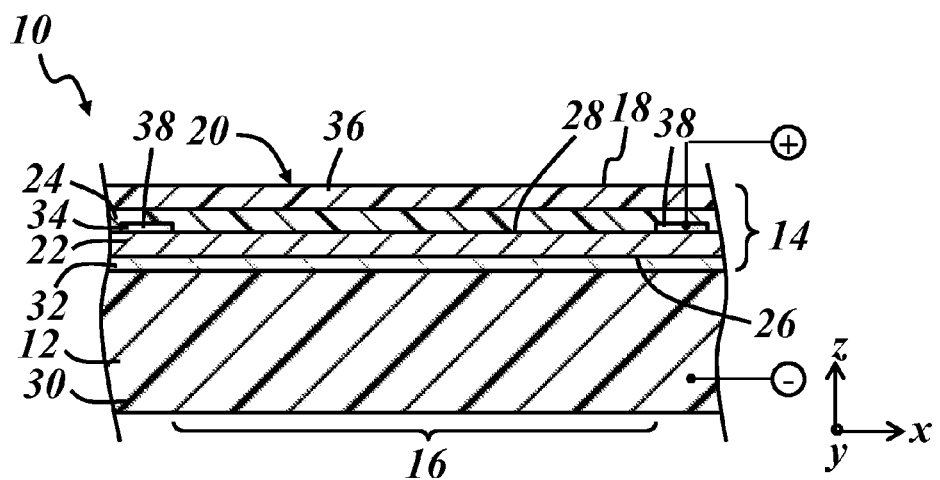
FIG. 2 is a partial cross-sectional view of an example of the electroluminescent element.

FIG. 2 is an enlarged and partial cross-sectional view of an embodiment of the vehicle interior panel 10, where the individual material layers are not necessarily drawn to scale. The panel 10 includes a light-emitting film layer 22 interposed between the substrate 12 and an electrically conductive film layer 24. The light-emitting layer 22 has a first side or face 26 facing toward the substrate 12 and an opposite second side or face 28 facing away from the substrate and toward the conductive film layer 24. The light-emitting layer 22 includes or is made from an electroluminescent material that produces and emits light in response to an applied voltage, and the electrically conductive layer 24 is at least partially transparent to the emitted light. More particularly, the light-emitting layer 22 produces visible light when a voltage potential is applied across the first and second sides 26, 28 thereof. Various types of materials are known to illuminate in the presence of the electric field produced between oppositely charged electrodes, including certain phosphorescent materials that emit photons in the presence of an alternating electric field, light-emitting materials used in small molecule OLEDs, and light-emitting materials used in PLEDs. The material of the light-emitting film layer 22 is preferably formulated for application in solution form—i.e. dispersed, suspended, or dissolved in a solvent. In this form, the film layer 22 can be disposed over the substrate 12 using conventional painting techniques or by a pad printing or transfer process.

In this embodiment, the substrate 12 comprises an electrically active material (not shown in FIG. 2) integrated into a plastic material 30. The electrically active material is configured to provide at least the active area 16 of the substrate 12 with sufficient electrical conductivity to function as a first or bottom electrode of the electroluminescent element 20, while the conductive layer 24 acts as the second or top electrode at the opposite side 28 of the light-emitting layer 22. Inclusion of the electrically active material in the substrate 12 eliminates the need for a separately formed and dedicated bottom electrode between the substrate and the light-emitting film layer 22, thereby eliminating multiple problems associated with such bottom electrodes, particularly painted-on bottom electrodes, which can be tremendously expensive. In one embodiment, the plastic material 30 is an injection-moldable thermoplastic material (e.g., ABS, PC/ABS, TPO, PP, PA66, etc.), and the electrically active material is an electrically active additive provided in a form that facilitates molding the plastic material into the desired shape of the panel 10. The plastic material 30 is not limited to thermoplastic materials or injection moldable materials.

As used herein, an "electrically active" material is a non-polymeric electrically conductive material or an inherently dissipative polymer (IDP) material. The phrase "integrated into" means "embedded in" in the case of non-polymeric electrically conductive materials, and "blended or alloyed with," in the case of IDP materials. Examples of suitable electrically conductive additives include chopped carbon fibers, carbon nanotubes (CNTs), particulate carbon black, graphite, or metallic additives, such as stainless steel fibers or particles. Other suitable conductive additives include both carbon-based materials and metal materials, such as metal plated or metalized carbon fibers (e.g., nickel-plated carbon fiber). Various IDP materials are commercially available (e.g., PermaStat Plus®, RTP Company, Winona, Minn., USA) and typically employed only as EM-shielding materials. But IDP materials can be integrated into the plastic material 30 to provide the substrate 12 with electrical conductivity as well. In some embodiments, the substrate 12 includes more than one electrically active material integrated into the plastic material 30, included an IDP material and a non-polymeric electrically conductive material. Electrically active additives in these forms can be compounded with the desired plastic material, pelletized, and molded to the desired shape. The substrate 12 may include other additives distributed throughout the plastic material 30, such as reinforcing additives (e.g., fiberglass or mineral fillers), colorants, fire retardants, etc.

Each type of electrically active additive has a threshold loading range in the molding material below which the material is electrically insulating and above which the material reaches its maximum conductivity (or minimum bulk resistivity). For example, when certain IDP materials are integrated into a given plastic material by compounding or alloying, the resulting molding material may have a threshold loading range between about 5 wt % and 15 wt %, or between about 8 wt % and 13 wt %. In another example, a given plastic material with carbon black as the electrically active additive has a threshold loading range between about 10 wt % and 20 wt %, or between about 12 wt % and 18 wt %. Though the threshold range is higher for carbon black than for an IDP material, the transition from insulating to conductive is more significant for carbon black, with the resulting substrate material having a bulk resistivity on the order of 10 ohm-cm about 20 wt %, while an IDP loading above 15 wt % may result in a bulk resistivity on the order of 0.1 to 10 gigaohm-cm. In another example, carbon fiber as the electrically active additive provides a threshold loading range between about 5 wt % and 10 wt %, or between about 6 wt % and 8 wt % with bulk resistivities approaching 1 to 10 ohm-cm or lower. In another example, CNTs as the electrically active additive provides a threshold loading range between about 1 wt % and 5 wt %, or between about 2 wt % and 3 wt % with bulk resistivities on the order of 10 ohm-cm. In another example, stainless steel fibers as the electrically active additive can provide a threshold loading range between about 3 wt % and 15 wt %, or between about 4 wt % and 7 wt % with a minimum bulk resistivity on the order of 0.01 ohm-cm. These threshold values may of course vary depending on any number of variables, including the size and shape of the conductive additive fibers or particles, the formulation of the plastic material, and/or the type of IDP material, for example.

The electrically conductive film layer 24 is overlying and in contact with the second side 28 of the light-emitting film layer 22 and overlying the active area 16 of the substrate 12. The electrically conductive layer 24 is at least partially transparent to the light emitted by the light-emitting layer 22 when the voltage potential is applied thereacross. The electrically conductive layer 24 is formulated and configured to provide sufficient electrical conductivity to function as the second or top electrode of the electroluminescent element 20. Various types of materials are known for use in conductive transparent film layers, including but not limited to poly(3,4-ethylenedioxythiophene) (PDOT or PEDOT), materials containing PDOT, antimony tin oxide (ATO), indium tin oxide (ITO), or transparent organic coatings including CNTs at a loading sufficient to impart conductivity but remain invisible as part of the conductive layer 24. One example of a suitable PEDOT-based material is commercially available in the CLEVIOS family of products (Heraeus Incorporated, HIC, New York, N.Y. USA). The material of the conductive layer 24 is preferably formulated for application in solution form—i.e. dispersed, suspended, or dissolved in a solvent. In this form, the conductive layer 24 can be disposed over the substrate 12 and the light-emitting layer 22 using conventional painting techniques or by a pad printing or transfer process.

The example of FIG. 2 also illustrates multiple optional film layers, including a dielectric film layer 32, a bus bar film layer 34, and a topcoat film layer 36. The dielectric layer 32 is an electrically non-conductive layer that may be provided between the substrate 12 and the light-emitting layer 22 to enhance the electric field produced between the substrate and the light-emitting layer when an AC voltage is applied thereacross. To perform this function, the dielectric layer 32 may include a titanate, such as barium titanate ($BaTiO_3$), or another non-polymer with a high dielectric constant (e.g., an oxide or aluminate), in a polymer matrix that exhibits high electromagnetic permittivity. The material of the dielectric layer 32 is preferably formulated for application in solution form—i.e. dispersed, suspended, or dissolved in a solvent. In this form, the dielectric layer 32 can be disposed over the substrate 12 prior to deposition of the light-emitting layer 22 using conventional painting techniques or by a pad printing or transfer process.

The bus bar film layer 34 is an electrically conductive layer that may provide electrical contacts for connection of one side of the applied voltage potential to the electrically conductive film layer or top electrode 24. The bus bar layer 34 is disposed over the substrate 12 and is in contact with the electrically conductive film layer 24. In this example, the bus bar layer 34 is disposed over the light-emitting layer 22 and the conductive film layer 24 is disposed over the bus bar layer. In other embodiments, the bus bar layer 34 may be disposed over or within the conductive layer 24. In this example, the bus bar layer 34 includes a pair of individual, spaced apart (in the x-direction of FIG. 2) bus bars 38. The bus bars 38 may be elongated in the y-direction and may or may not be electrically connected by another portion of the bus bar layer 34. The bus bar layer 34 is configured to be electrically connected to one side of the voltage potential—i.e., to the positive side in this example. A boundary of the electroluminescent element 20 is defined by the bus bars 38; that is, the intended light-emitting area of the electroluminescent element, and thus the active area 16 of the substrate 12, is between the spaced apart bus bars 38.

The material that forms the bus bar layer 34 has a higher electrical conductivity than the electrically conductive layer 24 and thus serves to more evenly distribute current along the electrically conductive layer 24 for more uniform illumination of the light-emitting layer 22. For example, the bus bar layer 34 may be formed as a metallic layer or may include a high metal content, making the bus bar layer opaque. The material of the bus bar layer 34 is preferably formulated for application in solution form—i.e. dispersed, suspended, or dissolved in a solvent. In this form, the bus bar layer 34 can be disposed over the substrate 12 and light-emitting layer 22 using conventional painting techniques or by a pad printing or transfer process. One suitable solvent-borne material for forming the bus bar film layer 34 is Silvaspray™ (Caswell, Inc., Lyons, N.Y., USA).

The topcoat film layer 36 may be a decorative layer, a functional layer, or both. For example, the topcoat layer 36 is preferably at least partially transparent to the emitted light to facilitate the illuminating function of the electroluminescent element 20. The material of the topcoat layer may also be partially opaque and/or may be configured to diffuse light passing therethrough. For example, the topcoat layer 36 may be a tinted clearcoat material that imparts color to the light emitted by the electroluminescent element 20. The topcoat layer 36 may also be electrically insulating to electrically isolate the applied voltage from the outer surface 18 of the panel. The topcoat layer 36 may also serve as a protective coating layer that protects the underlying layers such as the light-emitting layer 22 and the electrically conductive layer 24. Also, the topcoat layer 36 may provide the panel 10 with a continuous and smooth outer surface such that any edges or boundaries of the underlying layers are not noticeable. As shown in FIG. 2, the topcoat layer 36 may overlie the active area 16 of the substrate 12 and extend outwardly (i.e., in the x- and y-directions of FIG. 2) beyond the bus bars 38 and the active area of the substrate. The material of the topcoat layer 36 is preferably formulated for application in solution form—i.e. dispersed, suspended, or dissolved in a solvent. In this form, the topcoat layer 36 can be disposed over the other layers using conventional painting techniques or by a pad printing or transfer process.

Figure 3:
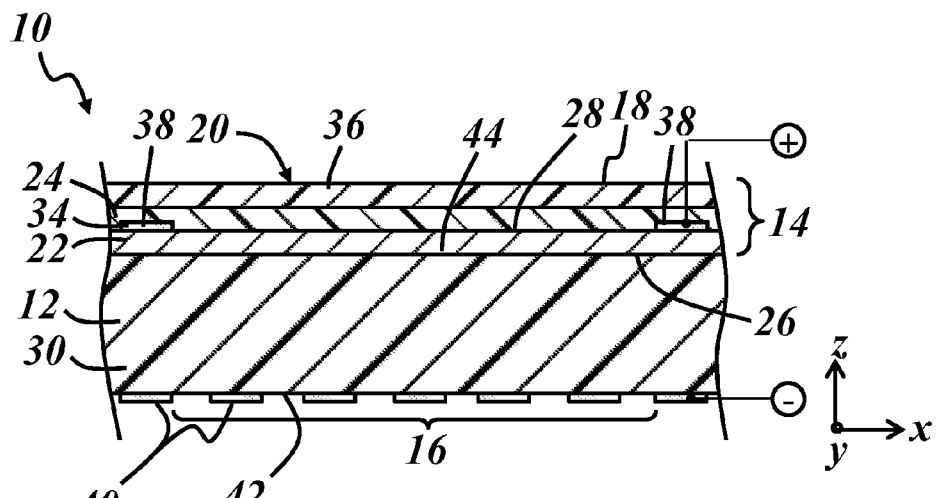
FIG. 3 is a partial cross-sectional view of an example of the electroluminescent element, with a substrate that includes a laser-activated electrically conductive material.

FIG. 3 is a partial cross-sectional view of an example of the vehicle interior panel 10 where the electrically active material of the substrate is an electrically conductive material formed from a laser-activated additive and embedded in the plastic material 30 of the substrate 12. In the particularly illustrated example, the substrate 12 is a molded-interconnect device (MID) that includes thin and flexible metal (e.g., copper) traces 40 bonded to the plastic material 30 at a trace side 42 of the substrate that faces away from the multi-layer film 14 of the electroluminescent element 20. As shown here, the separately formed dielectric film layer 32 (see FIG. 2) may be omitted but may be included in other embodiments.

The MID may be of the type in which the traces 40 are plated onto the plastic material 30 at locally conductive regions of the material. For example, the molded portion of the substrate 12 may be molded from a molding material that includes the plastic material 30 and a non-conductive additive that becomes conductive when activated by exposure to a laser beam of a particular type. Various laser direct structuring (LDS) materials are commercially available that are suitable for use as the substrate molding material. After the molding material is molded into the desired substrate shape, the trace side 42 of the substrate is selectively exposed to the laser beam where the traces 40 are desired. Electrically conductive material is formed at the trace side 42 wherever it is exposed to the laser beam and is effectively embedded in the plastic material 30. The traces 40 are then plated onto the molded and selectively activated material. Normally, this is where manufacturing of a MID ends, with other electronic elements or circuit components attached to an opposite component side 44 of the substrate 12 and interconnected by the traces 40 on the trace side 42. However, in this case, the presence of the laser-activatable additive in the substrate can be put to an unexpected use by making the substrate 12 usable as an electrode for the electroluminescent element 20.

For instance, more of the molded substrate material may be activated by a laser beam than is necessary for deposition of the traces 40. In one embodiment, the laser-activatable additive is activated through the thickness of the substrate 12 at the active area 16 of the substrate. In another embodiment, the component side 44 of the substrate 12 is at least partially activated by the laser to impart the substrate with electrically conductive material embedded in the plastic material 30 at the component side 44. In other embodiments, the traces 40 are omitted and the substrate 12 is not an MID, but a similar molding material is used to form the substrate 12 and the additive is laser-activated at least at the active area of the substrate to form the electrically conductive material embedded in the plastic material 30. The layers 22, 24, 36 overlying the substrate 12 are as described above in conjunction with the example of FIG. 2.

Figure 4:
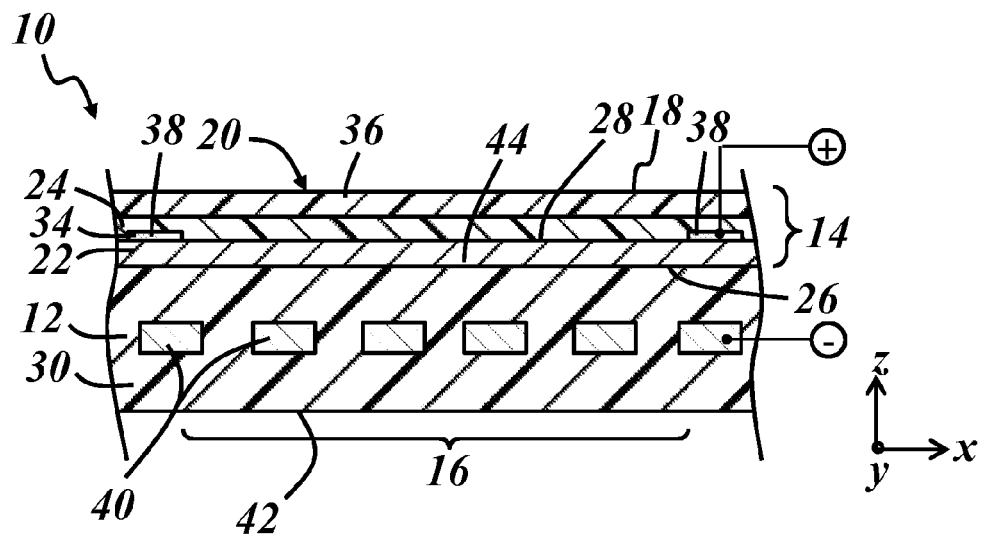
FIG. 4 is a partial cross-sectional view of an example of the electroluminescent element, with a substrate that includes an insert-molded metal bus bars.

FIG. 4 is a partial cross-sectional view of an example of the vehicle interior panel 10 where the electrically active material of the substrate 12 is an electrically conductive material embedded in the plastic 30 by insert-molding. In the particularly illustrated example, stamped or otherwise preformed metal traces 40 (e.g., copper) are over-molded with the plastic material during the substrate molding operation. Portions of the traces 40 may be entirely encapsulated in the plastic material 30 as shown, or the traces 40 can be embedded in the plastic material and exposed at one of the opposite sides 42, 44 of the substrate 12. The metal traces 40 function as bus bars and may be configured to receive one side (the negative side in FIG. 4) of the voltage potential. As in the example of FIG. 3, the separately formed dielectric film layer may be omitted, as shown, or may be included in other embodiments. The layers 22, 24, 36 overlying the substrate 12 are as described above in conjunction with the example of FIG. 2.

Figure 5:
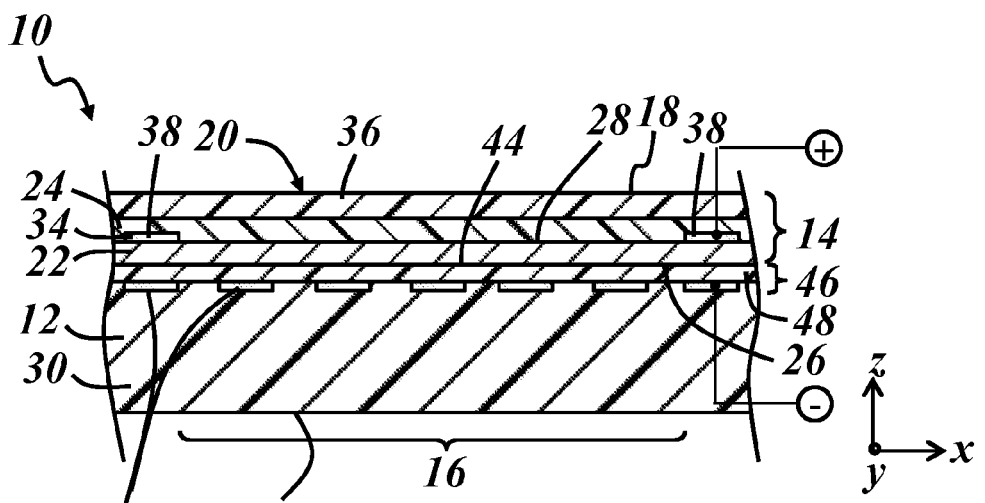
FIG. 5 is a partial cross-sectional view of an example of the electroluminescent element, with a substrate that includes an embedded metal foil.

FIG. 5 is a partial cross-sectional view of another example of the vehicle interior panel 10 in which the electrically active material of the substrate 12 is an electrically conductive material embedded in the plastic 30 by insert-molding. In the particularly illustrated example, a separately provided film 46 is insert-molded or back-molded onto the plastic material 30 during the substrate molding operation. The film 46 is initially provided with an insulating polymeric carrier film layer 48 with metal foil (e.g., copper) traces 40 already deposited on and bonded to the film layer 48. The film 46 is placed in the substrate mold and bonded to the plastic material 30 during the molding operation, during which the metal foil traces 40 are embedded in the plastic material 30 and encapsulated in the finished substrate 12 between the plastic material 30 and the insulating film layer 48. The metal foil traces 40 may function as bus bars and may be configured to receive one side (the negative side in FIG. 5) of the voltage potential. The layers 22, 24, 36 overlying the substrate 12 are as described above in conjunction with the example of FIG. 2. As in the examples of FIGS. 3 and 4, the separately formed dielectric film layer may be omitted, as shown, or may be included in other embodiments. These examples of the vehicle interior panel 10 illustrate yet another potential advantage and reduction in cost, manufacturing time, and manufacturing complexity via elimination of the separately applied dielectric layer.

In all of the above-described embodiments, separate application of a dedicated bottom electrode layer is unnecessary, as the substrate itself includes electrically active material that enables use of the substrate as the bottom electrode of the electroluminescent element. This is particularly advantageous as a replacement for bottom electrodes containing expensive metals such as silver or gold, especially where the expensive materials are deposited by painting processes. Instead, the electrically active material that imparts the substrate with electrical conductivity can be provided as an integrated part of the substrate by more controllable, more reliable, and lower cost processes such as plastic material compounding and pelletizing and/or insert-molding.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel, comprising:
   a substrate comprising an electrically active material integrated into a plastic material, the substrate being molded to provide an overall shape and contour of the vehicle interior panel and a majority of the thickness of the vehicle interior panel;
   a light-emitting film layer overlying an active area of the substrate and having a first side facing the substrate and an opposite second side facing away from the substrate, said film layer being configured to emit light when a voltage potential is applied across said first and second sides;
   an electrically conductive film layer overlying and in contact with the second side of the light-emitting film layer and overlying the active area of the substrate, wherein the electrically conductive film layer is at least partially transparent to the light emitted by the light-emitting film layer when the voltage potential is applied; and
   a topcoat film layer overlying the electrically conductive film layer and the active area of the substrate and extending beyond the active area of the substrate to provide a visible outer surface of the vehicle interior panel when installed in a vehicle cabin,
   wherein the electrically active material of the substrate is present at least at the active area so that the light-emitting film layer emits light from the visible outer surface of the vehicle interior panel when the voltage potential is applied across the active area of the substrate and the electrically conductive film layer.

2. A vehicle interior panel as defined in claim 1, further comprising a dielectric film layer interposed between and in contact with the active area of the substrate and the light-emitting film layer.

3. A vehicle interior panel as defined in claim 1, wherein the first side of the light-emitting film layer is in contact with the active area of the substrate.

4. A vehicle interior panel as defined in claim 1, further comprising a bus bar film layer in contact with the electrically conductive film layer at a location overlying a boundary of the active area of the substrate, the bus bar film layer comprising a metallic material and configured to receive one side of the voltage potential.

5. A vehicle interior panel as defined in claim 1, wherein the electrically active material is an additive to the plastic material and distributed throughout the plastic material in a form that allows the plastic material to be molded into said overall shape.

6. A vehicle interior panel as defined in claim 1, wherein the substrate comprises a non-conductive additive distributed throughout the plastic material, the additive being formulated to become conductive when activated by a laser, the electrically active material being formed from activated additive at the active area of the substrate.

7. A vehicle interior panel as defined in claim 1, wherein the electrically active material of the substrate comprises insert-molded metal bus bars configured to receive one side of the voltage potential.

8. A vehicle interior panel as defined in claim 1, wherein the electrically active material of the substrate comprises a metal foil embedded in the plastic material and interposed between the plastic material and an insulating film layer at an outer side of the substrate that faces toward the overlying film layers.

9. A method of making a vehicle interior panel that emits light from a visible outer surface, the method comprising the steps of:
- (a) providing a substrate comprising an electrically active material integrated into a plastic material, the substrate being molded to provide an overall shape and contour of the vehicle interior panel and a majority of the thickness of the vehicle interior panel;
- (b) disposing a light-emitting film layer over an active area of the substrate, said film layer being configured to emit light when a voltage potential is applied across opposite faces of said layer;
- (c) disposing an electrically conductive film layer over the light-emitting film layer and the active area of the substrate, wherein the electrically conductive film layer is at least partially transparent to the light emitted by the light-emitting film layer when the voltage potential is applied; and
- (d) disposing a topcoat film layer over the electrically conductive film layer and the active area of the substrate such that the topcoat film layer extends beyond the active area of the substrate to provide the visible outer surface of the vehicle interior panel when installed in a vehicle cabin,
  wherein the electrically active material of the substrate is present at least at the active area so that the light-emitting film layer emits light from the visible outer surface of the vehicle interior panel when the voltage potential is applied across the active area of the substrate and the electrically conductive film layer.

10. The method of claim 9, further comprising the step of disposing a bus bar film layer over the substrate and in contact with the electrically conductive film layer at a location overlying a boundary of the active area of the substrate, the bus bar film layer comprising a metallic material and configured to receive one side of the voltage potential.

11. The method of claim 10, wherein step (b), step (c), step (d), the step of disposing a bus bar film, or any combination of said steps is performed by pad printing.

12. The method of claim 9, wherein step (a) comprises molding the substrate from a pelletized material comprising the plastic material and the electrically active material.

13. The method of claim 9, wherein step (a) comprises:
molding a molding material into said overall shape and contour, the molding material comprising the plastic material and a non-conductive additive that is formulated to become conductive when activated by a laser; and
activating some of the additive with a laser to form the integrated electrically active material.

14. The method of claim 9, wherein step (a) comprises insert-molding metal bus bars into the plastic material.

15. The method of claim 9, wherein step (a) comprises insert-molding a film onto the plastic material, the film comprising a metal foil and an insulating film layer and the metal foil facing toward the plastic material during the step of insert-molding.

* * * * *